United States Patent [19]
Overbury

[11] 3,936,830
[45] Feb. 3, 1976

[54] DOPPLER NAVIGATION SYSTEM WITH TRACKING FILTER FOR MULTIPATH DISCRIMINATION

[75] Inventor: Francis G. Overbury, Cuffley, England

[73] Assignee: International Standard Electric Corporation, New York, N.Y.

[22] Filed: May 1, 1974

[21] Appl. No.: 465,861

[30] Foreign Application Priority Data
May 10, 1973 United Kingdom............... 22291/73

[52] U.S. Cl............ 343/113 DE; 328/167; 325/477; 333/76; 178/DIG. 19; 333/17 R
[51] Int. Cl.²........................................... G01S 5/02
[58] Field of Search ............... 343/113 DE, 106 D; 325/473, 477; 333/76, 17; 328/167; 178/DIG. 19; 334/11, 13, 16, 26, 40

[56] References Cited
UNITED STATES PATENTS

| | | |
|---|---|---|
| 3,110,004 | 11/1963 | Pope..................................... 333/76 |
| 3,119,961 | 1/1964 | Ambrose............................... 333/76 |
| 3,262,117 | 7/1966 | Stover............................. 343/106 D |
| 3,314,026 | 4/1967 | Maynard.............................. 333/17 |
| 3,715,690 | 2/1973 | Young et al. .......................... 333/17 |

Primary Examiner—Maynard R. Wilbur
Assistant Examiner—T. M. Blum
Attorney, Agent, or Firm—W. T. O'Neil

[57] ABSTRACT

A Doppler navigation system with tracking filter for reducing suceptibility to multipath signals. For acquisition of a Doppler ILS angle representing a signal within a spectrum also containing multipath signals, a self-tracking variable-Q filter arrangement is used, with wide band acquisition (low Q) followed by progressive steering of the filter center frequency to the desired signal frequency, together with decrease of the filter bandwidth to an equivalent of 2 beamwidths (high Q) at final balance.

6 Claims, 5 Drawing Figures 3,936,830

DOPPLER NAVIGATION SYSTEM WITH TRACKING FILTER FOR MULTIPATH DISCRIMINATION

BACKGROUND OF THE INVENTION

1. Field of the Invention

This invention relates generally to the field aids to air navigation and more specifically to the use of such a frequency tracking filter in a radio directional guidance system based on the Doppler principle.

2. Description of the Prior Art

Doppler radio navigation systems have been extensively described in the technical literature. For example, the technical journal, "Electrical Communication", published by International Telephone and Telegraph Corporation, Vol. 46 (1971), Number 4, contains an extensive article entitled "Doppler Scanning Guidance System". Also, the U.S. and European patent literature describes various aspects of such systems. British Pat. Nos. 1,225,190 and 1,234,541 and U.S. Pat. Nos. 3,613,096 and 3,601,684 are also pertinent for an understanding of the state of the prior art in such systems.

Moreover, for an understanding of other approaches and solutions to the multipath reception problem, U.S. Pat. Nos. 3,737,908; 3,774,222; 3,775,773; 3,781,897 and 3,795,002 are of interest.

In the basic Doppler system, a radio frequency source is commutated successively to the separate elements of a linear array of radiators, either to simulate uni-directional constant velocity motion of a single radiator, or an otherwise programmed scan, such as a to-and-fro constant velocity motion.

The angular position of a receiving station remote from the array is defined by the frequency of the commutated wave emitted in that direction, and particularly with azimuth systems using a horizontal array for provision of bearing information over a sector of typically ±60° normal to the axis of the array, frequency-counting type receivers used in the system must accept a band of frequencies which covers the complete sector of possible range of frequencies corresponding to such an angular sector.

However, the received bearing information signal does not consist of only the discrete information frequency (by direct propagation) but also of multipath components (by reflection).

In azimuth systems these multipath signals tend to be spread over the sector, in that they are derived from objects which subtend differing angles from the transmitter. Fortunately, however, the multipath spectra are unlikely to be crowded close to the desired information components.

SUMMARY OF THE INVENTION

According to the invention, there is provided a frequency tracking filter arrangement for acquisition, from a received signal, of a Doppler frequency corresponding to angle position data within a frequency band covering the complete sector of possible angles. The arrangement comprises a resonant circuit filter, including both variable resistive and variable reactive components, and means for controlling said variable components in such a manner that for acquisition of the angle information frequency (representing bearing for example) the passband of the filter is first set at a width embracing the entire frequency band of interest. Subsequently the center frequency of the filter is steered to the bearing information frequency and centered thereon while the passband is progressively narrowed to exclude other frequencies, corresponding for example, to multipath signals.

DESCRIPTION OF THE PREFERRED EMBODIMENT

Figure 1:
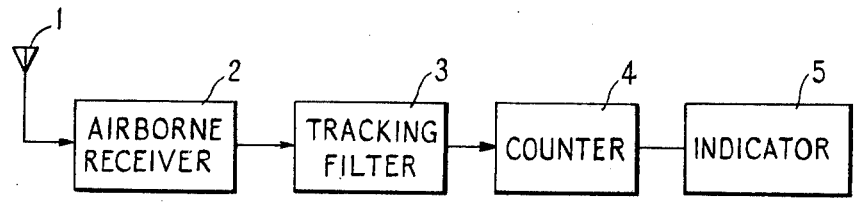
FIG. 1 is a block diagram of a Doppler navigation system receiver incorporating the tracking filter of the invention.

Referring now to FIG. 1, the major components aboard an aircraft desiring to determine its azimuth (bearing) and/or elevation (glideslope) angle are shown. An antenna 1 receives the ground (commutated) radiations and supplies them to receiver 2, these elements being substantially identical to those of prior art systems. The tracking filter, according to the present invention, is represented at 3, and the frequency counter 4 (a zero crossing counter for example) measures the Doppler frequency passed by 3. This counter and the indicator 5 are also substantially the same as known elements performing these functions in prior art systems.

Figure 2:
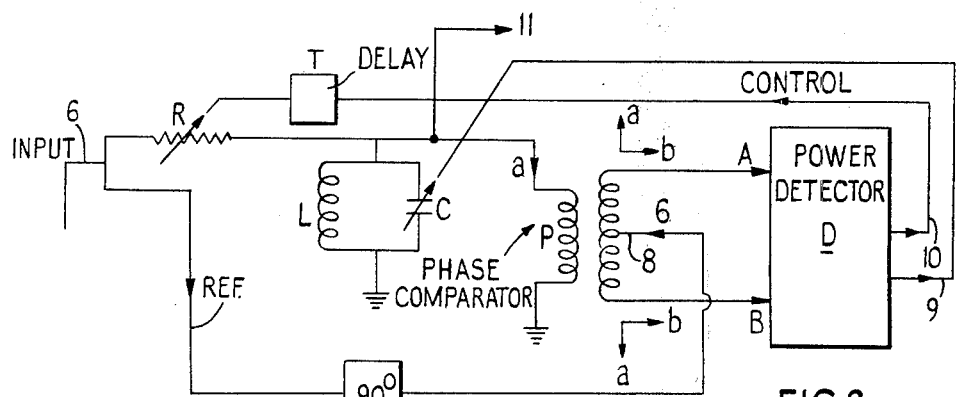
FIG. 2 is a circuit diagram of an azimuth tracking filter according to the invention.

Referring now to FIG. 2, the filter represented by 3 in FIG. 1 will be described.

A parallel resonant circuit comprising an inductance L and a variable capacitance C (a varactor in practice) provides the tunable element whose center frequency may be varied over the range of frequencies covering the complete azimuth sector. Spectral components which appear at the input 6 of the filter (from receiver 2) are applied to this resonant circuit via a variable resistance R (which may, in practice, be an F.E.T. operating as a continuously variable resistance or a switched arrangement of fixed resistors). By increasing the value of R, the Q of the circuit is raised and hence, its bandwidth narrowed.

The spectral input components are also applied to a phase comparator P and are therein compared with their own contribution at the filter output. Use is made of the relationship whereby components below resonance will lead with respect to those in the reference drive voltage at 8, whereas those above resonance will lag.

Each individual spectral component may be considered separately, in that, up to points A and B, a purely linear addition has been made. At these points therefore each component will appear at A with larger amplitude than it appears at B if it is below the center of the filter (for example) and vice versa if it is at higher frequency. The physical law determining the degree of amplitude unbalance is one of frequency displacement (phase relationship across the filter) and individual amplitude.

The summation of all components at A and B on a power basis accomplished in the power detector D, and the integration therein of the result over a period longer than the digitization sequence will define where, with respect to the center of the filter, the major line components lie, i.e., the time angle signal (bearing in the example). This permits derivation of a control signal initially to vary the capacitance (varactor) of the resonant circuit to steer it toward the major power grouping. Subsequently, through delay T, the resistance of R is increased to increase the Q. The delay T need only be long enough to allow the varactor to "track" before the Q is raised to narrow the bandwidth. It is important that the narrowing of the passband not proceed so quickly that the main signal is excluded before the filter can track it. The structure of Power detector D will be evident to those skilled in the art, from an understanding of the function required of it.

The outputs 9 and 10 are the varactor and Q controlling signal respectively, and they are substantially the same signal, i.e., from summation in D.

Figure 3:
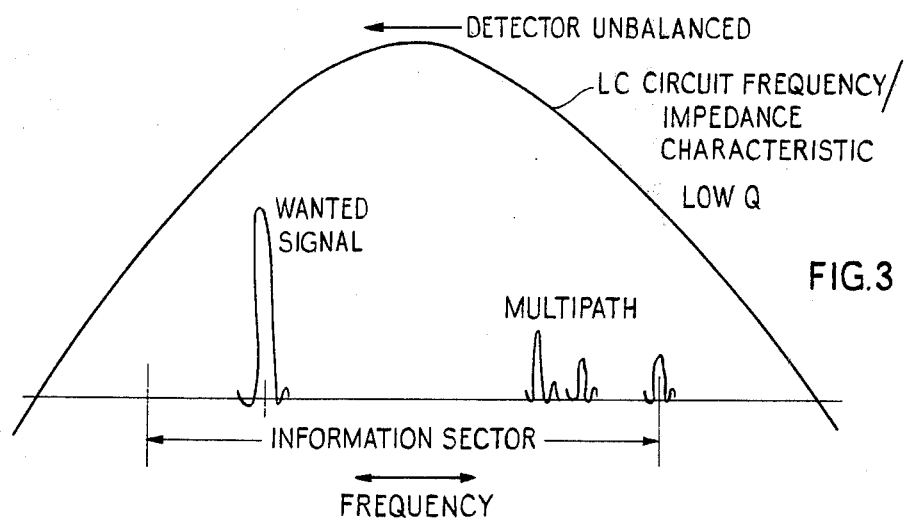
FIGS. 3, 4 and 5 depict signal frequencies and filter passbands under various operating conditions.

Thus, in operation, the filter has its Q at a low value initially so that the filter passband embraces the information sector frequency bandwidth, (see FIG. 3) on reception of the wanted signal together with multipath signals. It is here assumed, as depicted in FIG. 3, that the detector is unbalanced.

Figure 4:
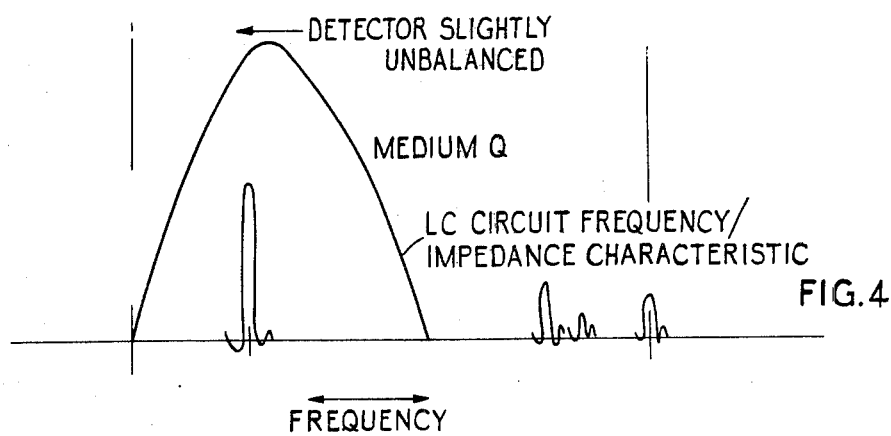
Figure 5:
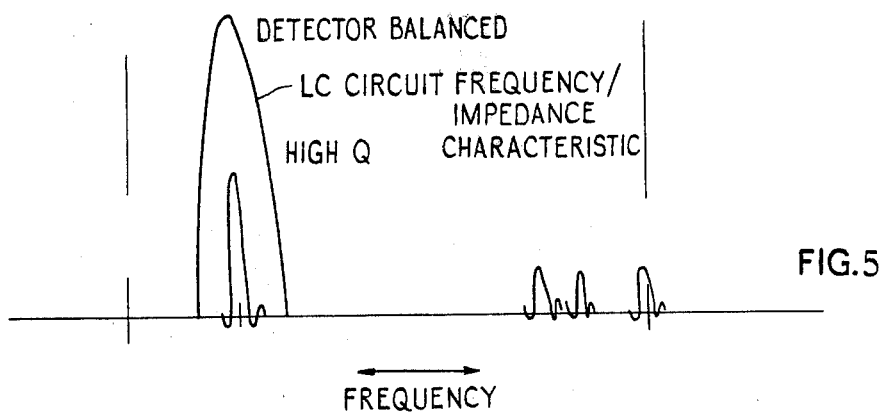

Thereafter, as shown in FIG. 4, the intermediate condition involves a slight unbalance of the detector as the center frequency of the filter is steered toward the desired signal with the Q of the filter being raised to a medium value. Finally, as shown in FIG. 5, the detector is balanced, so that the filter is centered on the main beam to be accurately symmetrical about the basic bearing defining envelope, the bandwidth of the filter having been decreased (for example) to an equivalent of about 2 beamwidths (high Q).

In view of the known characteristics of parallel resonant circuits, it will be seen that the output taken from terminal 11 of FIG. 2 is that provided to the indicator 5 of FIG. 1. Moreover, the LC circuit frequency/impedance characteristics depicted in FIGS. 3, 4 and 5 is extant at terminal 11.

It is to be understood that the foregoing description of a specific embodiment of this invention is made by way of example only, and is not to be considered as limiting the scope of the inventive concept thereto.

What is claimed is:

1. In Doppler navigation equipment responsive to ground transmissions from a commutated antenna array, including a receiver, frequency counting means responsive to the output of said receiver, and indicating means responsive to said counter to present angular information as a function of the count extant in said counter, a circuit operatively connected between said receiver and said counter comprising:

a filter circuit in the signal path from said receiver to said counter, said filter circuit comprising a resonant frequency controllable LC circuit substantially in parallel with the output terminals of said filter circuit, and a controllable value resistance in series with the signal path from the input terminal of said filter to said filter output terminal;

and first means for comparing the output of said filter with the frequency spectrum of signals at the output of said receiver to produce and apply a control signal to said LC circuit and to said controllable resistance to cause the center frequency to vary toward the frequency of the maximum power spectral line and to also narrow the passband of said filter, thereby to tend to eliminate signal energy corresponding to multipath reception.

2. Apparatus according to claim 1 in which said angle information is bearing.

3. Apparatus according to claim 1 in which said controllable LC circuit comprises a varactor responsive to the output of said first means, said varactor at least a part of the capacitance in said LC circuit, whereby the resonant frequency and therefore the passband of said LC circuit is caused to vary.

4. Apparatus according to claim 3 in which said controllable resistance comprises an F.E.T. connected to present a variable resistance between its main current carrying electrodes in response to said control signal.

5. Apparatus according to claim 1 in which said LC circuit is a parallel resonant circuit and said controllable resistance is capable of controlling the Q of said LC circuit such that the passband of said filter is correspondingly set to substantially cover the entire range of frequencies corresponding to the range of angles of interest in said navigation system.

6. Apparatus according to claim 5 including a delay circuit connected to delay said control signal to said controllable resistance, thereby to slow the narrowing of the bandwidth of said filter to avoid exclusion of the desired signal from the passband before said LC circuit resonance frequency is in substantial agreement with the desired spectral line of said receiver output.

* * * * *